Patented Jan. 26, 1932

1,842,711

UNITED STATES PATENT OFFICE

TOM BIRCHALL AND SAMUEL COFFEY, OF BLACKLEY, MANCHESTER, ENGLAND, ASSIGNORS TO IMPERIAL CHEMICAL INDUSTRIES LIMITED, OF WESTMINSTER, ENGLAND

MANUFACTURE OF N-THIO DERIVATIVES OF AMINES

No Drawing. Application filed April 3, 1930, Serial No. 441,424, and in Great Britain April 18, 1929.

This invention relates to improvements in the manufacture of N-thio derivatives of primary and secondary amines.

Hitherto the only known process for preparing compounds of this class has been based on the interaction of the amine with, e. g. sulphur chloride, $S_2Cl_2$ in a dry inert solvent, e. g. ether (cf. Michaelis and Luxembourg, Berichte der deutschen chemischen Gesellschaft, vol. 28, page 165), a dry inert solvent being used because of the known interaction between sulphur chloride and water.

Contrary to a prior belief that such compounds could only be formed in the absence of moisture or water, we have found that the reactions may be effected in an aqueous medium. Our new processes comprise reacting together in an aqueous medium sulphur chloride with an amine, such as a primary and secondary amine. In our process we may use any amine which contains the group

In our process, the aqueous medium should be neutral or alkaline. We find it advantageous to have an acid binding agent or absorbent present in the aqueous medium. Alkalized or alkaline reacting substances may be used. For instance, caustic alkali, alkali carbonate or an alkaline reacting salt of a weak acid may be dissolved in the aqueous medium before effecting the reaction. In our process, an excess of the amine may be used as such an acid binding agent or absorbent.

In carrying out our process, the amine is first mixed with the aqueous medium and then the sulphur chloride gradually added to the mixture thus obtained. These mixtures of the aqueous medium and the amine may be either aqueous solutions or dispersions. Diethylamine is soluble and when using this compound the reaction is effected in an aqeous solution. With ethylaniline, an aqueous dispersion may be prepared by suitable means and advantageously used in our process. These aqueous solutions or dispersions may have advantageously an alkaline reaction. This alkaline reaction may be obtained by adding the acid binding agent such as caustic alkali or caustic carbonate to the aqueous medium. In our process, we may not only use the amine compounds themselves but we may use salts of these amines, such as their hydrochloride type of salt. The use of a salt of these amines is advantageous, as such salts are usually soluble in the aqueous medium. However, when such salts are used, the aqueous medium should contain an equivalent quantity of an alkaline acid binding agent such as caustic alkali or alkali carbonate.

By our process, we produce N-thio derivatives having the general formula:

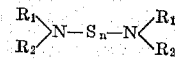

wherein $R_1$ represents a univalent organic radical, $R_2$ represents a hydrogen or a univalent organic radical and $n$ is a positive integer. Compounds of this type in which the radicals $R_1$ and $R_2$ are joined together to form a heterocyclic ring, for instance, a piperidine ring, may be advantageously made by our process. To prepare such compounds the amine used in a heterocyclic amine, for instance, piperidine. These classes of N-thio compounds are advantageously produced by our new process in excellent yield and in such a state that they may be easily recovered and purified.

Our new process may be advantageously used to produce certain sub-generic classes of compounds, of which the following formulæ are typical.

One formula is:

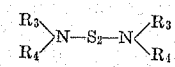

wherein $R_3$ represents an alkyl group and $R_4$ represents an alkyl or aryl group.

Another formula is:

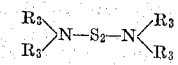

wherein $R_3$ represents an alkyl group,

A third formula is:

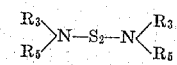

wherein $R_5$ represents an aryl group,

And a fourth formula is:

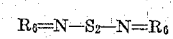

wherein $R_6$ represents the carbocyclic portion of a heterocyclic ring.

In carrying out our process we may use a 2-stage or 2-step reaction. For instance, approximately four molecular proportions of an amine are mixed with an aqueous medium and about one molecular proportion of sulphur chloride slowly added to the aqueous mixture. The N-thio compound produced may be purified in a suitable manner, for instance, by steam distillation. The reaction which occurs in this step may be represented as follows:

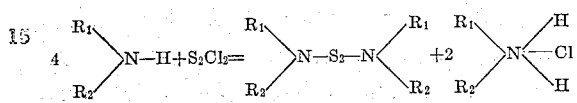

The aqueous medium after separation of the N-thio compound, contains the hydrochlorid salt of the excess amine used. The amine hydrochlorid may be recovered from the aqueous medium or the aqueous medium containing it may be used directly in the second stage of the process. When the amine hydrochlorid has been recovered, it is then dissolved in an aqueous solution containing a suitable amount of caustic soda in solution. The mixture thus obtained is cooled and then sulphur chlorid and a concentrated solution of caustic soda are gradually and simultaneously added to the cooled mixture. After reaction is substantially complete the mixture may be diluted if necessary to dissolve any sodium chlorid. The further quantity of the N-thio compound thus produced is isolated, recovered and purified as in the first step. If desired, the first step may be omitted and the process carried out starting with the hydrochlorid of the amine; the procedure being similar to that in the second step.

The products of our invention find application in the rubber industry.

Our invention is illustrated, but not limited, by the following examples in which the parts are by weight.

*Example 1.*—34 parts of sulphur chloride ($S_2Cl_2$) is added slowly, with stirring, to a cooled solution of 73 parts of diethylamine in 120 parts of water. When all is added, the oil is separated and purified by steam distillation. The diethylamine hydrochloride which is formed as a by product is isolated from the aqueous liquor the interaction being represented by the following equation:

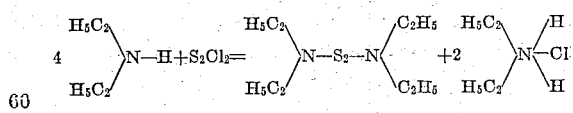

*Example 2.*—219 parts of diethylamine hydrochloride are dissolved in 500 parts of water, 80 parts of caustic soda, as concentrated solution, are added. The cooled mixture is vigorously stirred while 135 parts of sulphur chloride and 80 parts of caustic soda, a concentrated solution, are gradually and simultaneously added. The mixture is diluted if required to dissolve any sodium chloride which separates and the product is isolated as indicated in Example 1 the N-thio compound thus obtained is the same as that obtained in Example 1 and may be represented by the same formula.

*Example 3.*—34 parts of sulphur chloride are gradually added to a well stirred and cooled aqueous suspension of 121 parts of ethylaniline in 100 parts of water. The oily product is separated and washed with dilute acid to remove any unchanged ethylaniline the product may be represented by the following formula:

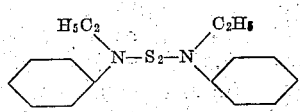

Piperidine may be substituted for the diethylamine in the processes of Examples 1 and 2 and there is obtained an N-thio compound of the same general type which may be represented by the following formula:

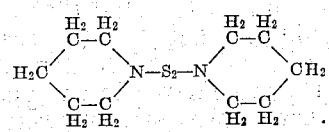

Having now particularly described and ascertained the nature of our said invention and in what manner the same is to be performed, we declare that what we claim is:—

1. In the manufacture of N-thio compounds from primary and secondary amines, the process which comprises reacting together in the presence of an aqueous medium, sulphur chloride with an amine of the class consisting of primary and secondary amines and their salts.

2. In the manufacture of N-thio compounds from primary and secondary amines, the process which comprises reacting together in the presence of an aqueous medium, sulphur chloride with an amine having the probable formula:

wherein $R_1$ represents a univalent organic radical and $R_2$ represents hydrogen or a univalent radical and recovering the N-thio compound thus obtained, said N-thio compound having the probable formula:

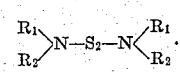

3. In the manufacture of N-thio compounds from primary and secondary amines, the process which comprises reacting together in the presence of an aqueous medium, sulphur chloride with an amine having the probable formula:

wherein $R_3$ represents an alkyl group and $R_4$ represents an alkyl or aryl group and recovering the N-thio compound thus obtained, said compound having the probable formula:

4. In the manufacture of N-thio compounds from primary and secondary amines, the process which comprises reacting together in the presence of an aqueous medium, sulphur chloride with an amine having the probable formula:

wherein $R_3$ represents an alkyl group and recovering the N-thio compound thus obtained, said compound having the probable formula:

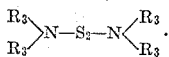

5. In the manufacture of N-thio compounds from primary and secondary amines, the process which comprises reacting together in the presence of an aqueous medium, sulphur chloride with an amine having the probable formula:

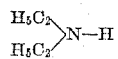

and recovering the N-thio compound thus obtained, said compound having the probable formula:

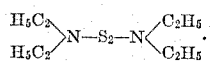

6. In the manufacture of N-thio compounds from primary and secondary amines, the process which comprises reacting together in the presence of an aqueous medium, sulphur chloride with an amine having the probable formula:

wherein $R_3$ represents an alkyl group, and $R_5$ represents an aryl group and recovering the N-thio compound thus obtained, said compound having the probable formula:

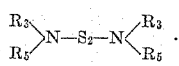

7. In the manufacture of N-thio compounds from primary and secondary amines, the process which comprises reacting together in the presence of an aqueous medium, sulphur chloride with an amine having the probable formula:

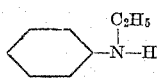

and recovering the produced N-thio compound, said N-thio compound having the probable formula:

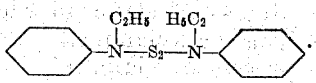

8. In the manufacture of N-thio compounds from primary and secondary amines, the process which comprises reacting together in the presence of an aqueous medium, sulphur chloride with an amine having the probable formula:

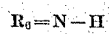

wherein $R_6$ represents the carbocyclic portion of an heterocyclic ring and recovering the N-thio compound thus obtained, said compound having the probable formula:

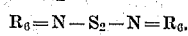

9. In the manufacture of N-thio compounds from primary and secondary amines, the process which comprises reacting together in the presence of an aqueous medium, sulphur chloride with an amine having the probable formula:

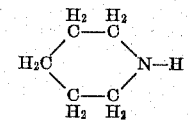

and recovering the N-thio compound thus obtained, said compound having the probable formula:

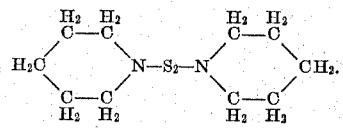

10. In the manufacture of N-thio compounds from primary and secondary amines, the process which comprises reacting together in an alkaline aqueous medium, sulphur chlorine and an amine, said amine containing the group

and isolating the N-thio compound thus produced.

11. The process of claim 10 wherein the said aqueous medium contains a caustic alkali.

12. The process of claim 10 wherein the said aqueous medium contains an alkali carbonate.

13. The process of claim 10 wherein the said aqueous medium contains an alkali salt of a weak acid.

14. The process of claim 10 wherein the said aqueous medium contains caustic soda.

15. In the manufacture of N-thio compounds from primary and secondary amines, the process which comprises reacting together in the presence of an aqueous solution containing an acid binding agent, sulphur chlorid with an amine of the class consisting of primary and secondary amines and their salts.

16. The process of claim 15 wherein the said amine is a dialkylamine.

17. The process of claim 15 wherein the said amine is diethylamine.

18. In the manufacture of N-thio derivatives, the process which comprises dissolving an amine hydrochloride in an aqueous solution of caustic soda, gradually and simultaneously adding sulphur chloride and a concentrated solution of caustic soda to the said aqueous solution of the amine hydrochlorid and after the reaction is substantially complete, separating the N-thio compound thus formed from the aqueous mixture.

In testimony whereof we affix our signatures.

TOM BIRCHALL.
SAMUEL COFFEY.

Certificate of Correction

Patent No. 1,842,711.  Granted January 26, 1932, to

TOM BIRCHALL ET AL.

It is hereby certified that error appears in the printed specification of the above-numbered patent requiring correction as follows: Page 3, lines 48 to 50, claim 6, strike out the formula and insert instead

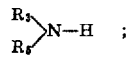

same page, line 109, claim 10, for " chlorine " read *chloride;* and that the said Letters Patent should be read with these corrections therein that the same may conform to the record of the case in the Patent Office.

Signed and sealed this 1st day of March, A. D. 1932.

[SEAL.]  M. J. MOORE,
*Acting Commissioner of Patents.*